Patented Feb. 9, 1954

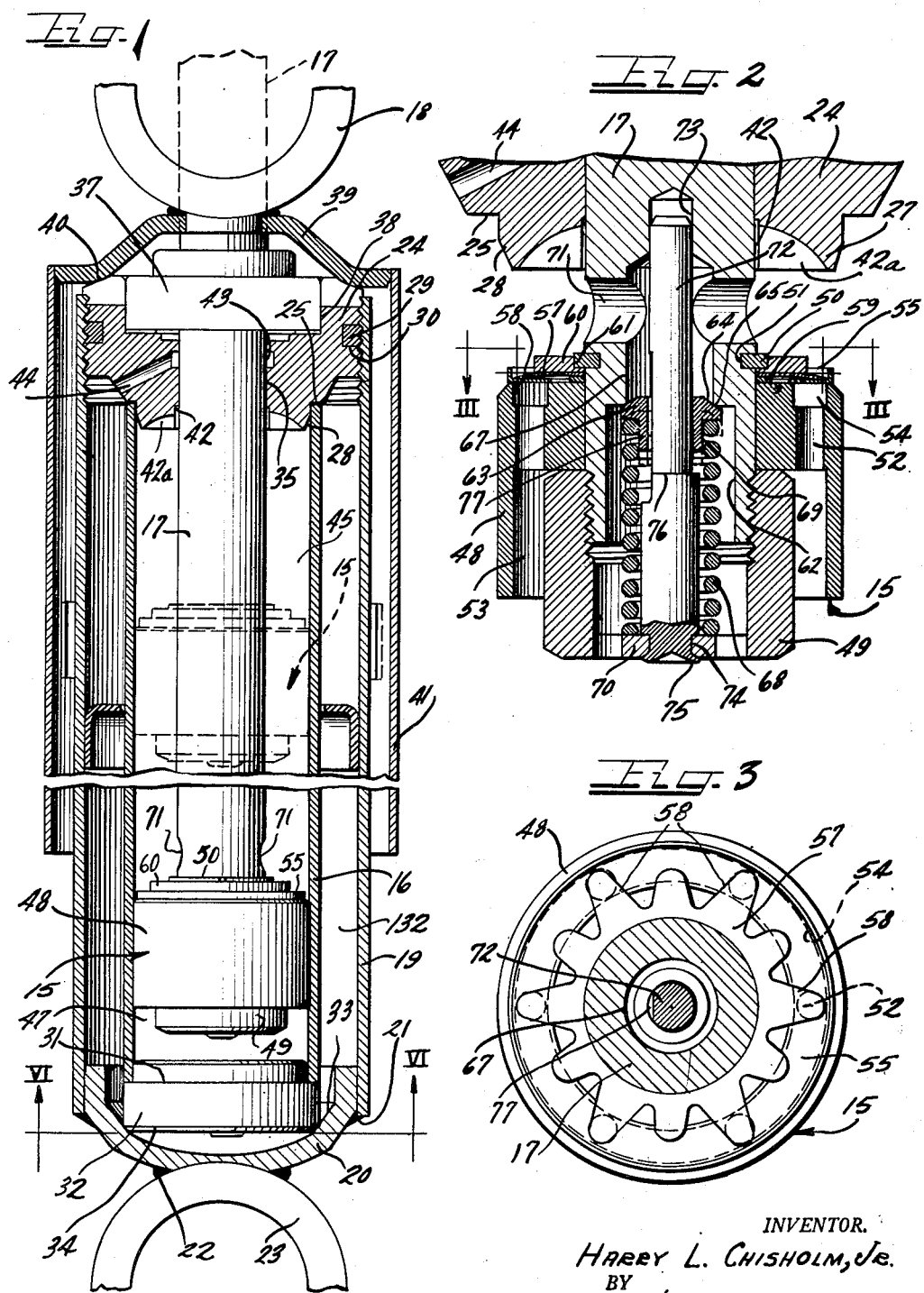

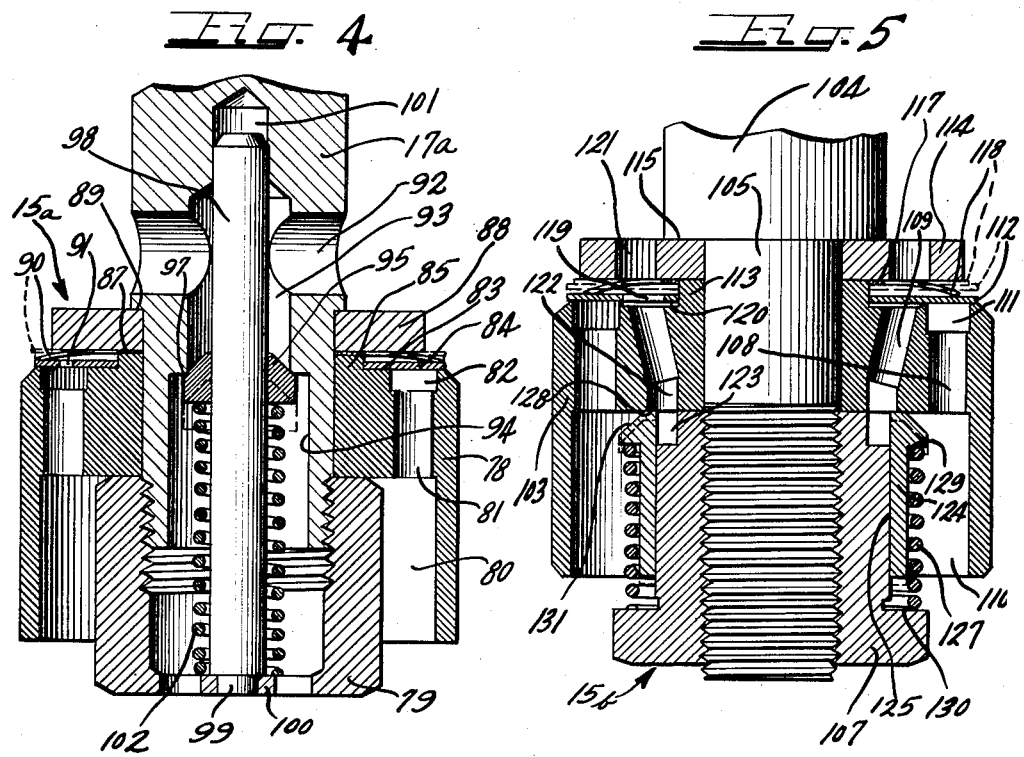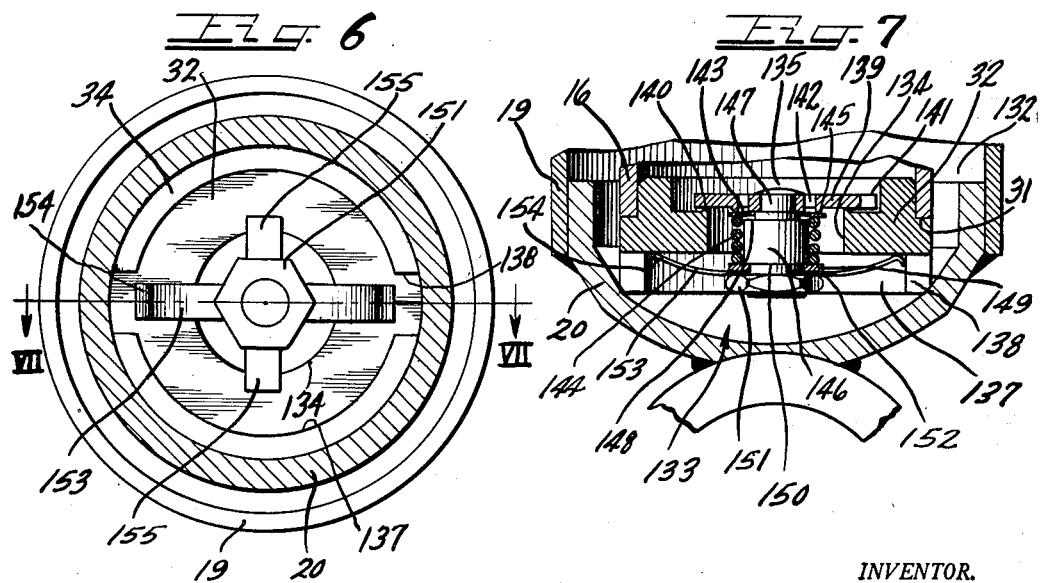

2,668,604

UNITED STATES PATENT OFFICE 2,668,604

TELESCOPIC SHOCK ABSORBER PISTON CONSTRUCTION

Harry L. Chisholm, Jr., Buffalo, N. Y., assignor to Houdaille-Hershey Corporation, Detroit, Mich., a corporation of Michigan Application January 8, 1947, Serial No. 720,853

10 Claims. (Cl. 188—100)

This invention relates to improvements in direct acting or telescopic shock absorbers, and more particularly to shock absorbers of this type wherein a valved piston is reciprocably slidable within a cylinder in the presence of a hydraulic fluid.

An important object of this invention is to provide an improved direct acting hydraulic shock absorber which is especially well adapted for low cost mass production methods of manufacture but nevertheless measures up to high performance standards.

Another object of the invention resides in the provision of a direct acting shock absorber assembly comprising relatively few easily manufactured parts that are especially well adapted for high speed assembly.

A further object of the invention resides in the provision of improved control valve means in a direct acting hydraulic shock absorber.

Still another object of the invention is to provide novel valve structure in the piston of a direct acting shock absorber responsive to respective compression stroke and rebound stroke hydraulic pressures in the operation of the shock absorber.

Other objects, features and advantages of the present invention will be readily apparent from the following detailed description of certain preferred embodiments thereof taken in conjunction with the accompanying three sheets of drawings, in which:

Figure 1 is a fragmental, diametral, sectional view through a direct acting hydraulic shock absorber embodying the features of the present invention;

Figure 2 is an enlarged, diametral, fragmentary, sectional view through the piston of the shock absorber showing the same in close adjacency to the head closure for the cylinder;

Figure 3 is a transverse, sectional detail view taken substantially along the line III—III of Figure 2;

Figure 4 is a diametral, fragmentary, sectional view through a modified form of piston;

Figure 5 is a diametral, sectional view through a further modified form of piston;

Figure 6 is a transverse, sectional plan view through the lower end of the hydraulic shock absorber taken substantially in the plane of line VI—VI of Figure 1; and Figure 7 is a diametral, fragmentary, sectional view taken substantially along the line VII—VII of Figure 6.

A direct acting or telescopic shock absorber of the type with which the present invention is concerned operates on the principle of hydraulic fluid resistance to the reciprocations within a cylinder of a piston which is connected to one of two relatively movable parts, such as the sprung mass of a vehicle, while the cylinder is connected to the other of the relatively movable parts, such as the unsprung mass of the vehicle. In such a shock absorber the compression stroke of the piston, while resisted to a certain extent, is freer than the rebound stroke which is controlled to be substantially resisted to occur at a slower rate.

A shock absorber conforming to these requirements and embodying an improved, simplified assembly including novel and highly efficient control valve means is shown in Figure 1. This shock absorber comprises a piston 15 reciprocable within a cylinder 16 and having a piston rod 17 which extends beyond the end of the cylinder 16 and carries at its outer end suitable means such as an eye 18 by which it is adapted to be connected to one of relatively movable members such as an automobile chassis.

Concentric about the cylinder tube 16 is a tubular reservoir casing 19 of somewhat greater length and having the lower end thereof telescoped about the rim of a cup-shaped bottom head or closure, both the tubular casing 19 and the head 20 being formed from metal and secured together in fluidtight relation as by means of welding 21. Secured to the outer side of the end closure 20 as by means of welding 22 is an eye 23 by which the lower end of the shock absorber is adapted to be connected to the remaining relatively movable member such as the axle structure of a vehicle in which the shock absorber is installed.

To secure the cylinder tube 16 rigidly within the shock absorber assembly, the top closure plug 24 is threaded into the upper end of the reservoir casing 19 and is formed with a downwardly facing annular shoulder 25 opposing the upper end of the cylinder 16. A downwardly protruding axial boss 27 on the plug has its upper portion cylindrical and its lower portion formed with an assembly-easing tapering circumference 28 and depends into the upper end portion of the cylinder 16 with a diametral press fit to insure hydraulic seal and concentricity. A thread seal 29 carried in an annular, radially outwardly opening intermediate groove 30 in the closure plug 24 provides a fluidtight joint between the plug and the reservoir casing 19.

At its lower end the cylinder 16 bears against an annular, upwardly facing stepped shoulder 31 on a lower closure member or foot valve casing 32 which is clamped thereby against the inside of the lower closure cup 20. A properly self-centered relationship of the closure member 32 with respect to the closure cup 20 is assured by an inwardly sloping annular herein substantially frusto-conical formation 33 of the inner wall of the closure cup 20 against which the lower edge of the closure member 32 shoulders, such lower edge being preferably formed with a complementary seating bevel 34. Thus, assembly of the shock absorber structure is substantially facilitated while at the same time manufacturing tolerances may be relatively large, the entire assembly being held together by the top closure plug 24. The cylinder 16, in the course of assembly, is substantially self-centering and with especial regard to the piston 15, the latter during the assembly operation being preferably disposed closely adjacent to the bottom of the cylinder 16 to assist in the attainment of concentricity.

Passage for the piston rod 17 is afforded through the closure plug 24 by an axial bore 35 therethrough. Leakage of hydraulic fluid out through the bore 35 or transportation of fluid beyond the bore by outward movement of the piston rod 17 is prevented by a packing gland unit 37 which is fitted within a concentric counterbore 38 in the outer end of the plug 24.

A head 39 carried by the outer extremity of the piston rod 17 has an annular shoulder 40 by which it is adapted to engage the outer end of the closure plug 24 as a limit stop upon extreme inward movement of the piston rod 17 and the piston 15. A shield tube 41 may be secured as by means of welding or the like to the outer edge of the shoulder 40 and surrounds the reservoir casing 19 in spaced concentric relation.

Outward transportation of hydraulic fluid by the piston rod 17 is further prevented by scraping off thereof in a groove 42 formed as a counterbore at the inner end of the piston bore 35 and into which open radial pressure relief slots 42a. An axially outwardly spaced fluid trap and drainage channel 43 annularly formed in the bore 35 and draining by means of a lateral passage 44 into the top of the reservoir space provided between the reservoir tube 19 and the cylinder 16 take care of such fluid as does travel out on the piston rod 17.

The piston 15 divides the space within the cylinder 16 into an upper high pressure chamber 45 and a lower low pressure chamber 47. In service a relatively low order of resistance is afforded to downward or compression movement of the piston 15 by hydraulic fluid which fills the chambers 45 and 47 while on the return or rebound stroke of the piston a relatively high order of resistance is provided for. To this end the piston 15 is equipped with a valve system which will appropriately respond to hydraulic fluid pressures in the reciprocations of the piston to control the shock absorbing or damping function of the piston.

Accordingly, the piston 15 comprises a skirted, annular piston body 48 of an outside diameter to fit in close, sliding engagement with the inside surface of the cylinder 16 and of sufficient length to obviate the need for any special sealing gasket between the cylindrical sliding interfaces of the piston and cylinder. The internal diameter of the piston body 48 is such as to adapt the same for sliding assembly with the inner terminal end portion of the piston rod 17. A retaining nut 49 is threaded onto the lower end portion of the piston rod 17 for securing the piston body 48 in place and has a lower portion extending axially downwardly beyond the end of the piston rod. Opposing the retaining nut 49 clampingly is means such as a split ring 50 seated in an annular, radially outwardly opening groove 51 in the piston rod.

For compression blowoff, the piston body 48 is provided with a plurality of hydraulic fluid passages 52 (Figures 2 and 3) which are disposed in a uniformly spaced series adjacent to the periphery of the piston body and extend axially between a chamber 53 defined by the skirted portion of the piston body and an annular, axially upwardly opening channel 54 in the upper shoulder of the piston body. Compression blowoff is normally restrained by a check valve structure 55 which in the present instance is preferably an outer marginally flange-reinforced flat ring disk of a diameter and width to seat sealingly on the shoulder of the piston body over the blowoff channel 54. Normal fluid sealing relation of the valve ring 55 is maintained by a relatively weak, radially fingered ring disk spring 57 bearing thereagainst and having an internal diameter to fit about the piston rod 17. The spring 57 has a plurality of equally spaced, radially extending downwardly bowed spring fingers 58 engaging the outer margin of the valve 55. The fingers 58 are appropriately tensioned to afford the proper compression blowoff resistance to the check valve 55. Although, as seen in Figure 3, the piston is provided with six compression blowoff passages 52 and the check valve spring 57 with an equal number of the tensioned fingers 58 for uniformly opposing the check valve, the spring fingers and the passages 53 need not necessarily coincide but may be disposed in any haphazard rotative relationship, thus facilitating assembly by relieving the need for particular attention to this detail. The spring fingers 58 are of uniform length with the tips thereof adjacent to the marginal reinforcing flange of the check valve disk 55 for maintaining the check valve in substantial concentricity and in sealing relation to the blowoff channel 54.

Attachment of the spring 57 in properly spaced relation to the check valve disk 55 is effected by clamping the spring between a narrow flat spacer ring 59 closely encircling the piston rod 17 and bearing on the shoulder of the piston body 48, and a retaining collar ring 60 engaging the upper side of the spring ring 57 and having an upper inside corner, rabbet groove 61 complementary to and receptive of the contiguous marginal portion of the split retaining ring 50. Thereby, the clamping action of the retaining nut 49 against the piston body 48 acts, through the piston body to drive the spacer 59, the ring 60 and the interposed spring ring 57 longitudinally clampingly against the split retaining ring 50. At the same time the ring 60 locks the split ring 50 against spreading, and leaving its retaining groove 51.

In the compression stroke of the piston 15, flow of hydraulic fluid past the piston will be resisted with cushioning or shock absorbing effect by the check valve 55 under the influence of the spring 57 up to a predetermined rather low pressure, whereupon the spring fingers 58 yield and the check valve will unseat for compression blowoff of hydraulic fluid from the pressure chamber 47 through the piston chamber 53, the passages 52 and the blowoff channel 54 into the high pressure chamber 45. However, the valve 55 effectively checks return flow of hydraulic fluid in the rebound movement of the piston 15, Control of rebound hydraulic fluid flow from the high pressure chamber 45 past the piston 15 into the low pressure chamber 47 is effected by a valve structure which is preferably operative within a relatively large diameter axial bore 62 in the inner terminal end portion of the piston rod 17 and including a blowoff check valve 63. The valve 63 is preferably of the plug type having a generally frusto-conical face 64 engageable with a valve seat 65 provided as a shoulder at the mouth of a reduced diameter axial upward extension 67 of the axial valve bore 62. Means for normally relatively strongly biasing the rebound blowoff valve 63 herein comprises a strongly loaded coiled compression spring 68 driving against the lower shoulder of the head of the valve about a reduced diameter shank 69 thereof and seated upon an integral spider 70 at the lower end of the retaining nut 49. The tension of the spring 68 is predetermined to hold the blowoff check valve 63 seated in opposition to substantial rebound hydraulic fluid pressure exerted against the valve within the axial bore 67 by way of a cross bore 71 opening thereinto through the piston rod 17 above the piston 15. In response to predetermined rebound hydraulic fluid pressure the check valve 63 is adapted to be unseated, as is indicated in broken outline in Figure 2, in opposition to the biasing spring 68. Thereby hydraulic fluid displaced from the high pressure chamber 45 passes over the low pressure chamber 47, flowing past the valve 63 through the bore 62 and out through the bore in the nut 49 and through the spider 70. Compression stroke blowoff is entirely checked by the valve 63.

Means for guiding the rebound blowoff valve 63 for reciprocal movement and holding the same substantially concentric within the bore 62 and preventing canting or transverse vibration thereof comprises in the present instance a guide pin or rod 72 which extends in slidable guiding relation axially through the valve 63 and has its upper extremity or tip within a reduced diameter pilot bore extension 73 in the piston rod. The lower extremity of the guide pin is of reduced diameter and extends through an axial hole 74 in the spider 70, being secured as by peening or rivet heading 75 fixedly to the spider. A limit upon the blowoff opening movements of the valve 63 is provided by the guide pin 72 through the medium of an enlarged diameter shoulder 76 disposed at an appropriate distance below the lower end of the valve in its normally seated position.

Means are provided to accommodate normal restricted or metered hydraulic fluid displacement between the chambers 45 and 47 to cushion the relatively low magnitude shock absorbing reciprocations of the piston 15 and to serve in the nature of an orifice-before-blowoff for preliminary limited flow of hydraulic fluid on both compression and rebound strokes of the piston. To this end, the valve guide pin 72 is flattened to provide a chordal face 77 throughout a longitudinal extent from well below to well above the area thereof encompassed by the valve 63 throughout its reciprocal range of operation whereby to provide a free, metering hydraulic fluid passage by-passing the valve 63.

In the operation of the piston 15, therefore, low magnitude reciprocations corresponding to comparatively slight or low magnitude relative movement of the respective movable members to which the shock absorber is attached are accommodated by the by-pass orifice provided by the flat 77 of the valve guiding pin 72. When the compression stroke magnitude and intensity demands, compression blowoff through the passages 52 in the piston and past the check valve 55 tends to equalize the pressure in the cylinder chambers 45 and 47. On rebound action, wherein the most important shock absorbing function of the shock absorber occurs, equalization of pressure between the cylinder chambers, when greater pressure develops in the pressure chamber 45 than can be equalized through the metering orifice afforded by the valve guiding pin flat 77, will be taken care of by unseating of the rebound blowoff valve 63. By having the effective compression blowoff valves and rebound blowoff valves 55 and 63, respectively, properly biased for their respective functions, with regard, of course, to the springing and weight of the vehicle in which the shock absorber unit is installed, excellent riding qualities by use of the shock absorber are attained even though the valve structure and the compression and rebound hydraulic fluid flow or equalizing system of the piston are of a relatively simple character.

While the piston 15 in service normally assumes approximately the position indicated in broken outline in Figure 1, and in the extreme compression stroke assumes the full outline position of Figure 1 as limited by the head 39, the extreme rebound stroke may proceed to engagement of the retaining ring 50 with the inner end of the closure plug boss 27. In the latter position, rebound fluid block on passage of the transverse ports 71 outwardly past the tip of the boss is avoided by the counterbore 42 and the relief slots 42a.

A further important attribute of the piston structure 15 resides in the low cost at which the same may be manufactured while at the same time attaining a high degree of operating efficiency. As to this, the uniformly cylindrical nature of the piston rod 17 contributes effectively since it can be finished on a centerless grinder instead of a center grinder and thereby acquires a high degree of concentricity which is highly important for operating concentricity of the piston 15 in the cylinder 16.

In the modified, alternate form of piston 15a shown in Figure 4, simplification and reduction in number of component parts has been attained. In this form, a skirted piston body 78 is slidably assembled about the piston rod 17a and retained by a nut 79 threaded onto the inner extremity of the piston rod.

From a chamber 80 defined within the skirt portion of the piston body 78 hydraulic fluid is adapted to pass for compression relief or blowoff through a series of axially extending hydraulic fluid passages 81 which lead into an annular, axially upwardly opening groove or channel 82 in a stepped shoulder 83 of the upper side of the valve body providing a flat, annular seat for a flat disk ring check valve 84 which normally lies in sealing relation to the compression blowoff channel 82. The check valve 84 is maintained concentric by an upwardly projecting hub 85 integral with the piston body 78 and of such height as to clamp a flat, disk ring type spring 87 in normally spaced relation to the check valve 84 and against a backing ring 88 which in turn is seated and clamped against an opposing retaining shoulder 89 on the piston rod. A series of uniformly radially extending and downwardly bowed low tension spring fingers 90 on the biasing spring 87 extend downwardly within the space provided between the top of the check valve 84 and the opposing face of the backing ring 88 and act normally to hold the valve ring 84 on its seat. The tension of the spring fingers 90 is properly calculated to afford the desired degree of low compression blowoff resistance for the check valve 84.

Low magnitude and preliminary hydraulic fluid displacement in both directions is provided for by having the check valve 84 formed with a uniform series of small bleed orifices 91.

For rebound equalizing hydraulic fluid blowoff, the piston rod 17a is formed with a cross bore 92 above the piston in communication with an axial fluid passage bore 93 which in turn communicates with or forms an axial continuation of a lower end axial counterbore 94 of larger diameter in the piston rod. Compression fluid flow is entirely blocked and rebound blowoff is resisted to a predetermined value through the fluid passages 92, 93, 94 through the piston rod by a plug type check valve 95 having the seating face thereof substantially frusto-conical and sealingly engaging with a valve seat 97 provided as an axially inwardly facing shoulder at the inner end of the counterbore 94.

An axial guide for the valve 95 is provided by a cylindrical guide pin 98 having the lower end thereof of reduced diameter to provide a securing boss 99 preferably fixedly assembled with an integral spider 100 at the lower end of the nut 79 and extending slidably through the valve 95. The upper end of the pin 98 fits concentrically slidably within a pilot bore upward extension 101 of the fluid passage bore 93. The relationship of the valve 95 to the guide pin 98 is such that while the valve is permitted to reciprocate freely between fully seated and unseated positions, as shown in full and broken lines respectively, it is held constantly against lateral movement and thus is free from canting or chatter which might otherwise develop in service.

A preferred degree of relatively strong spring bias is afforded for rebound blowoff check valve 95 by means such as a coiled compression spring 102 held in substantially concentric relation about the guide pin 98 and bearing at its upper end against the valve 95 and at its lower end against the spider 100.

In a further modified alternative form of piston 15b, as shown in Figure 5, a skirted cylindrical annular piston body 103 is carried by a piston rod 104 which for this purpose is provided with a reduced diameter lower stem extremity 105 onto which is threaded a retaining nut 107.

In the piston 15b, provision is made for both compression blowoff and rebound blowoff hydraulic fluid passage directly through the piston body 103. To this end the piston body is formed with an axially extending outer, annularly spaced series of compression blowoff passages 108 and with an inner, annular series of generally axially and preferably slightly radially downwardly and inwardly extending rebound blowoff passages 109, both of which series of passages communicate through the top of the piston body 103 with a chamber 110 within the lower skirted portion of the piston body.

The compression blowoff passages 108 communicate at their upper ends with an annular, axially upwardly opening channel 111 which is normally sealed against rebound hydraulic fluid flow by a check valve disk or ring 112 which is held substantially concentric by an axially upwardly extending spacer hub 113 integral with the piston body. The hub 113 bears against a backing disk or ring 114 seated against a shoulder 115 at the lower end of the larger diameter portion of the piston rod 104 and confines under predetermined compression a disk or ring type of biasing ring 117 having a radially extending series of downwardly bowed spring fingers 118 bearing against the top of the check valve 112 normally to hold it seated. Upon compression blowoff, hydraulic fluid working against the check valve 112 from the channel 111 acts to unseat the valve in opposition to the spring fingers 118 as indicated in broken outline.

Rebound pressure relief or blowoff through the passages 109 take place through openings 119 in the check valve disk 112 and a shallow axially upwardly opening groove 120 in the top of the piston body 103 at the entry ends of the passages 109. For improved rebound fluid flow to the openings 119, the spring backing plate or ring 114 may be formed with appropriate flow passages 121. At their discharge ends the rebound passages 109 open into an annular downwardly opening axial chamber 122 with which registers an annular, rabbet groove 123 in the upper, outer edge of the retaining nut 107.

Blowoff hydraulic fluid through the registering channel 122 and groove 123 is blocked or checked by a valve member 124 which is in the form of a sleeve slidable on a cylindrical guide surface 125 provided therefor on the nut 107. Means such as a coiled compression spring 127 normally biases the valve member 124 into sealing relation wherein the upper sealing edge, identified at 128, bears sealingly against the valve body 103 about the outer margin defining the channel 122. For this purpose, the spring 127 encircles the valve member 124 and bears against a downwardly facing radial shoulder 129 adjacent to the upper end of the valve member, while the lower end of the spring seats on a lateral flange 130 integral with the lower end of the nut 107.

To render the valve member 124 responsive to blowoff hydraulic fluid pressure, the radially inner marginal portion of the axially upwardly directed valve face 128 is annularly exposed to the blowoff fluid pressure within the channel 122. As a result, when sufficient rebound blowoff pressure has developed to act upon the exposed annular portion of the valve face 128 to overcome the bias of the spring 127, the valve member 124 will slide open, as indicated in broken outline, and afford a pressure relief opening from the channel 122 and the groove 123 into the piston chamber 110 which is freely open below the piston. To facilitate fluid flow thereby with a minimum of agitation, the head end of the valve member 124 is preferably beveled, as indicated at 131, from the valve face 128.

Since in the reciprocations of the piston within the cylinder of the shock absorber unit provision must be made for the volumetric displacement of the piston rod, the space between the cylinder 16 and the surrounding reservoir casing 19 is utilized as a piston rod displacement reservoir or replenishment chamber 132 which has no direct communication with the high pressure chamber 45 but does have communication with the low pressure chamber 47 through a foot valve structure 133 (Figures 6 and 7) associated with casing 32. To this end, the casing 32 is formed with an axial displacement bore or port 134 of substantial diameter opening at its upper end into an enlarged diameter counterbore 135 and at its lower end into a yet larger diameter counterbore 137. From the counterbore 137 radial slots 138 afford communication passages for fluid between the space below the casing 32 and the reservoir 132. Due to the substantially dished construction of the closure cup 20, the free space below the foot valve assembly will be of substantial volume.

Flow of hydraulic fluid through the displacement port 134 is checked against compression pressure or force by the piston 15 by a check valve 139 which is preferably in the form of a disk seating on the shoulder provided by the counterbore 135 and which is preferably formed about the bore 134 with a raised narrow, annular valve seat 140 affording a thin line, non-sticking contact with the valve disk 139. The disk valve 139 is formed with uniformly spaced radially extending spacer fingers 141, the ends of which closely approach the cylindrical wall of the counterbore 135 for maintaining the valve substantially concentric with respect to the valve seat 140.

The valve disk 139 checks the flow of hydraulic fluid through the bore 134 responsive to displacement pressure on the compression stroke of the piston, but it is during such stroke that actual displacement of hydraulic fluid from within the cylinder is necessary in order to compensate for the displacement of the piston rod. To this end, means for controlled compression fluid displacement are provided by an annular, concentric series of small displacement orifices or ports 142 through the valve disk 139 and of predetermined aggregate flow area. For cushioning or shock absorbing purposes, displacement of hydraulic fluid through the ports 142 is controlled by a valve 143 which is normally biased with predetermined force or tension by a compression spring 144 into sealing relation with the lower face of the valve 139 about the area of the ports 142.

High efficiency with a minimum of operational noise is attained by having the valve 143 in the form of a disk ring, relatively thin and preferably formed on a slight frusto-conical bevel to seat against a complementary downwardly projecting seat 145 formed about and including the ported area in the valve disk 139 and sloping away from the ports 142. Thereby the displaced hydraulic fluid issuing through the ports 142 is directed laterally and downwardly into the space provided by the displacement port 134.

The compression spring 144 is preferably in the form of a helically coiled member concentrically encompassing a downwardly extending stem member 146 which is secured through the medium of a headed reduced diameter stem 147 on the axis of the valve disk 139 to depend therefrom. At the base of the stem 147, the stem is formed with a clearance rabbet groove 148 to accommodate the check valve 143 throughout a limited axial range of opening movement.

An abutment for the lower end of the valve biasing spring 144 is provided by a collar 149 in the form of a ring disk bearing against a downwardly facing shoulder 150 adjacent to the lower end of the valve stem 146 and secured in place by means such as a nut 151 threaded onto the lower end of the valve stem.

Hydraulic fluid displaced from the low pressure chamber 47 in the compression stroke of the piston 15 will bleed through the ports 142 in the valve disk 139 upon attaining a pressure which will overcome the predetermined tension of the valve biasing spring 144 to force the check valve 143 open. Due to the predetermined resistance to compression fluid displacement afforded by the check valve 143, there is assurance that in the compression stroke of the piston 15 sufficient hydraulic fluid will be displaced from the low pressure chamber 47 to the high pressure chamber 45 in the cylinder to maintain the latter filled before pressure fluid is displaced into the reservoir 132. At the same time, of course, the shock absorbing function of the unit is implemented by the hydraulic fluid flow resistance afforded by the check valve 143 in conjunction with the compression blowoff valve resistance afforded in the piston assembly.

On the other hand, the preferred operating condition within the shock absorber unit requires that replenishment of the hydraulic fluid supply in the low pressure chamber 47 during the rebound stroke of the piston 15 be accomplished with a minimum of hydraulic fluid resistance so that the action of the rebound blowoff check valve in the piston assembly will not be unbalanced or unduly influenced and the full benefits of the high pressure created in the high pressure chamber 45 will be utilized in the rebound stroke of the piston. To this end, the check valve 139 is positively held to its seat with sufficient restraint to avoid being unseated by back pressure working thereunder in the compression stroke of the piston but of a low enough order to permit the valve to be unseated comparatively freely during the rebound stroke of the piston for rebound replenishment of the low pressure chamber 47 in the cylinder. In the present instance this is accomplished by equipping the valve stem 146 with a relatively weak fingered restraining spring 152 which may comprise a thin axially apertured disk clamped between the collar 149 and the nut 151. The spring 152 has a pair of diametrically extending relatively long and highly flexible, outwardly bowed spring fingers 153 terminally formed with smoothly rounded engagement pads 154 bearing slidably against the under face of the casing 32 within the counterbore 137. The arrangement of the spring fingers 153 is such that the valve disk 139 may unseat to a liberal extent for replenishment flow of hydraulic fluid thereby.

For limiting the total extent of unseating movement of the valve 139, radially extending preferably horizontal limit fingers 155 at right angles to the spring fingers 153 may be provided on the collar 149 for engaging the underside of the casing 32 in supplement to the fully sprung fingers 153 when the valve disk 139 has reached its predetermined unseated limit. Such limit is preferably held to within the depth of the radially confining counterbore 135 so that the centering fingers 141 of the valve disk will not leave the upper limit of the counterbore.

For features of patentable novelty residing in the foot valve structure of the present disclosure as depicted in Figs. 6 and 7, and not claimed herein, reference is made to my copending application Serial No. 202,976, filed December 27, 1950, as a division of the present application.

It will be understood that modifications and variations may be effected without departing from the scope of the novel concepts of the present invention.

I claim as my invention:

1. In combination in a direct acting shock absorber, a piston and piston rod assembly including a piston body slidably received on the end portion of the piston rod, shoulder means on the piston rod, a nut member threaded onto the extremity of the piston rod and clamping the piston body in place with respect to said shoulder means, a fluid passage through the piston rod bypassing the piston and opening axially through said extremity, a guide rod supported by said nut and extending into said passage, and a valve member slidable on said guide rod and controlling the flow of fluid through said passage.

2. In combination in a direct acting shock absorber, a piston and piston rod assembly including a piston body slidably received on the end portion of the piston rod, shoulder means on the piston rod, a nut member threaded onto the extremity of the piston rod and clamping the piston body in place with respect to said shoulder means, a fluid passage through the piston rod, a guide rod supported by said nut, and a valve member slidable on said guide rod and controlling the flow of fluid through said passage, said valve member and said guide rod having a restricted bleed passage therebetween.

3. In combination in a direct acting shock absorber construction, a piston structure including a piston rod having an axial fluid passage bore in its extremity portion and a cross bore communicating with the inner end portion of said fluid passage bore, an annular groove in said rod below said cross bore, a split ring shoulder member in said groove, a valve body slidably received on the extremity portion of the piston rod, a retaining nut threaded onto the extremity portion of the rod and retaining the valve body between its adjacent contiguous face and said shoulder member, said nut having a spider thereon carrying a guide rod extending axially through said bore, and a valve slidable on said rod and controlling the flow of fluid through said bore.

4. In a direct acting hydraulic shock absorber construction, a piston operable in a cylinder for dividing the cylinder into high pressure and low pressure chambers, a piston rod on the piston formed with a rebound blow-off fluid passage therethrough including an axial bore in the piston rod, a smaller diameter stem extending axially through said axial bore, a valve slidable on said stem and normally biased into sealing relation to said passage, and means for compression blow-off, said stem having continuously open bleed passage in the periphery thereof by-passing said valve.

5. In combination in a direct acting hydraulic shock absorber construction, a cylinder, a piston reciprocable in said cylinder and dividing the same into high and low pressure chambers, a piston rod carrying the piston, an axial bore in the end of the piston rod extending to the high pressure side of the piston and having passage therefrom communicating through the piston rod to the high pressure chamber, a smaller diameter stem extending axially through said axial bore, and a rebound blow-off valve slidable on said stem and normally biased into sealing relation to said passage, said axial bore having a reduced diameter shoulder intermediate the ends thereof affording a seat for said rebound blow-off valve.

6. In combination in a direct acting shock absorber construction, a piston assembly including a rod, said rod having an axial fluid passage bore through an extremity portion thereof and lateral openings from said bore spaced substantially from the end of said extremity portion, shoulder means on said rod at the side of said openings nearest the rod extremity, a piston member slidably engaged on the rod extremity portion, said piston member being of generally inverted cup-shape and having fluid displacement ports adjacent its periphery extending in generally axial direction and a skirt extending substantially beyond said ports in the opposite direction from said shoulder means, valve means for controlling fluid displacement through said ports, a nut member threaded onto the extremity portion of the rod member and clamping said piston member against said shoulder means, said nut being of substantially smaller diameter than the internal diameter of said skirt to afford clear passage about the nut within said skirt communicating with said ports, said nut being hollow and having spider structure at its end remote from the piston member, a stem carried by said spider and projecting into said rod bore, a valve member carried by said stem, and spring biasing means normally biasing said valve member into closing relation to said rod bore.

7. In combination in a direct acting shock absorber construction, a piston and piston rod assembly comprising a piston rod having an extremity portion with an axial bore therein and lateral passages into said bore spaced substantially from the end of said extremity portion, shoulder means on said rod extremity portion, a piston body slidably mounted on said extremity portion, said bore having an annular shoulder seat therein, and valve means for controlling displacement of fluid through said bore including a cylindrical guide stem and a spring biased valve member of annular form and substantial length slidably guided by said stem and having a frustoconical face sealingly engaging said annular seat.

8. In combination in a telescopic shock absorber construction, a piston rod and piston assembly comprising, in combination, a piston rod having an elongated fluid displacement bore opening through one end thereof, said rod having at least one lateral passage leading to said bore spaced substantially from said one end, a reduced diameter shoulder within said bore adjacent to said lateral passage and spaced substantially from said one end, a piston body carried by said rod and externally fastened thereto between said lateral passage and said one end, means associated with said rod and piston body and carrying a stem of smaller diameter than said bore, said stem projecting into said bore past said shoulder, and a valve member slidably mounted on said stem and engaging said shoulder in fluid sealing relation, said valve member being of smaller outer diameter than the diameter of the rod bore in the portion of the rod bore between said shoulder and said rod end.

9. In combination in a telescopic shock absorber construction of the character described, a piston rod, a piston mounted on one end portion of the rod, said rod end portion having an axial bore therein and at least one lateral opening from the bore beyond said piston, a valve seat shoulder in said bore, means associated with said piston and rod and supporting a valve stem of smaller diameter than said bore, said stem extending entirely through said bore and into a pilot bore extension of said bore inwardly beyond said lateral opening, and a valve member slidably carried by said stem and seating against said valve seat shoulder.

10. In combination in a telescopic shock absorber assembly of the character described, a piston rod, a piston carried by one end portion of the rod, a longitudinally extending fluid displacement bore in said piston rod opening through said end portion, means associated with said piston and rod and supporting a valve stem extending into said bore, said bore having an annular valve seat shoulder, and a valve member slidably carried by said stem and seating on said shoulder, said valve stem having a shoulder spaced from said valve seat shoulder and limiting unseating movement of the valve member from said shoulder.

HARRY L. CHISHOLM, JR.

References Cited in the file of this patent

UNITED STATES PATENTS

| Number | Name | Date |
|---|---|---|
| Re. 21,908 | Beecher | Sept. 30, 1941 |
| 1,160,028 | Wright | Nov. 9, 1915 |
| 1,229,885 | Chadwick | June 12, 1917 |
| 1,402,218 | Cushing | Jan. 3, 1922 |
| 1,610,409 | Anthony | Dec. 14, 1926 |
| 1,719,028 | Standlee | July 2, 1929 |
| 1,806,338 | Elsey | May 19, 1931 |
| 2,263,284 | Beecher | Nov. 18, 1941 |
| 2,346,275 | Read et al. | Apr. 11, 1944 |
| 2,355,491 | Whisler | Aug. 8, 1944 |
| 2,379,750 | Rossman | July 3, 1945 |
| 2,394,356 | Beecher | Feb. 5, 1946 |
| 2,396,227 | Beecher | Mar. 12, 1946 |
| 2,410,539 | Whisler | Nov. 5, 1946 |
| 2,481,088 | Cuskie | Sept. 6, 1949 |

FOREIGN PATENTS

| Number | Country | Date |
|---|---|---|
| 379,364 | Germany | Aug. 19, 1921 |